US009475003B2

(12) United States Patent
Hirose et al.

(10) Patent No.: US 9,475,003 B2
(45) Date of Patent: Oct. 25, 2016

(54) EXHAUST GAS PURIFICATION CATALYST, METHOD OF PRODUCING THE SAME, AND EXHAUST GAS PURIFICATION METHOD USING THE SAME

(71) Applicant: TOYOTA JIDOSHA KABUSHIKI KAISHA, Toyota-shi, Aichi-ken (JP)

(72) Inventors: Takuto Hirose, Nagakute (JP); Kiyoshi Yamazaki, Nagakute (JP); Yuichi Sobue, Toyota (JP); Yusuke Shinmyo, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/727,191

(22) Filed: Jun. 1, 2015

(65) Prior Publication Data

US 2015/0343423 A1 Dec. 3, 2015

(30) Foreign Application Priority Data

Jun. 2, 2014 (JP) ................................ 2014-114235

(51) Int. Cl.

*B01D 53/94* (2006.01)
*B01J 35/00* (2006.01)
*B01J 37/02* (2006.01)

(Continued)

(52) U.S. Cl.

CPC .............. *B01D 53/944* (2013.01); *B01J 21/12* (2013.01); *B01J 23/42* (2013.01); *B01J 23/44* (2013.01); *B01J 35/0013* (2013.01); *B01J 35/023* (2013.01); *B01J 37/0219* (2013.01); *B01J 37/0242* (2013.01); *B01J 37/0248* (2013.01); *B01J 37/08* (2013.01); *B01D 2255/1021* (2013.01); *B01D 2255/1023* (2013.01); *B01D 2255/2092* (2013.01); *B01D 2255/9022* (2013.01); *B01D 2255/9202* (2013.01); *B01D 2258/012* (2013.01); *F01N 3/103* (2013.01)

(58) Field of Classification Search

CPC .................... B01D 53/944; B01D 2255/9022; B01D 2255/2092; B01D 2255/30; B01D 2255/9202; B01D 2255/1023; B01D 2258/012; B01D 2255/102; B01J 23/44; B01J 37/0248; B01J 37/0242; B01J 35/023; B01J 23/42; B01J 37/08; B01J 37/0219; B01J 21/21; B01J 35/0013; F01N 3/103

See application file for complete search history.

(56) References Cited

U.S. PATENT DOCUMENTS

2014/0106260 A1* 4/2014 Cargnello ........... B01J 37/0072 429/528

FOREIGN PATENT DOCUMENTS

JP 11-19521 A 1/1999
JP 11-138008 A 5/1999

(Continued)

*Primary Examiner* — Anthony J Zimmer

(74) *Attorney, Agent, or Firm* — Sughrue Mion, PLLC

(57) ABSTRACT

An exhaust gas purification catalyst includes an alumina support, a silica layer, and active metal particles. The silica layer is formed on a surface of the alumina support. The active metal particles are formed of platinum and palladium, the platinum and the palladium being supported on the silica layer. A ratio of fine particles having a particle size of 2.0 nm or less to all the active metal particles is 50% or higher in terms of the number of particles, the fine particles being included in the active metal particles. A ratio of fine alloy particles having a palladium content ratio of 10 at % to 90 at % to all the fine particles is 50% or higher in terms of the number of particles, the fine alloy particles being included in the fine particles.

7 Claims, 6 Drawing Sheets

SILICA LAYER
Pt-Pd ALLOY
$Al_2O_3$

(51) Int. Cl.

| | |
|---|---|
| ***B01J 37/08*** | (2006.01) |
| ***B01J 21/12*** | (2006.01) |
| ***B01J 23/42*** | (2006.01) |
| ***B01J 23/44*** | (2006.01) |
| ***B01J 35/02*** | (2006.01) |
| *F01N 3/10* | (2006.01) |

(56) References Cited

FOREIGN PATENT DOCUMENTS

| | | |
|---|---|---|
| JP | 2007-000697 A | 1/2007 |
| JP | 2013-107055 A | 6/2013 |

* cited by examiner

EXHAUST GAS PURIFICATION CATALYST, METHOD OF PRODUCING THE SAME, AND EXHAUST GAS PURIFICATION METHOD USING THE SAME

INCORPORATION BY REFERENCE

The disclosure of Japanese Patent Application No. 2014-114235 filed on Jun. 2, 2014 including the specification, drawings and abstract is incorporated herein by reference in its entirety.

BACKGROUND OF THE INVENTION

1. Field of the Invention

The present invention relates to an exhaust gas purification catalyst, a method of producing the same, and an exhaust gas purification method using the same.

2. Description of Related Art

In the related art, various kinds of exhaust gas purification catalysts have been studied in order to purify harmful components (for example, carbon monoxide (CO) and hydrocarbon (HC)) in gas exhausted from an internal combustion engine such as a diesel engine or a lean burn engine having low specific fuel consumption. As such an exhaust gas purification catalyst, an exhaust gas purification catalyst using various metal oxides as a support has been proposed.

As such an exhaust gas purification catalyst, for example, Japanese Patent Application Publication No. 2007-697 (JP-2007-697 A) discloses an exhaust gas purification catalyst including: a support that is formed of a metal oxide such as alumina; noble metal particles of Pt, Pd, Rh, or the like that are supported on the insides of pores of the support; and an aggregation inhibitor that is formed of an metal oxide containing Al, Zr, Ce, and Si and with which surfaces of the noble metal particles are enclosed or coated. However, in the exhaust gas purification catalyst of the related art disclosed in JP-2007-697 A, oxidation activity to CO or HC at a low temperature is not necessarily sufficient.

In addition, Japanese Patent Application Publication No. 11-138008 (JP 11-138008 A) discloses an exhaust gas purification catalyst including: a support that is formed of a crystalline silica porous body; and a catalytic noble metal such as Pt, Rh, or Pd that is supported on the support, in which a molar ratio ($SiO_2/Al_2O_3$) of silicon dioxide to aluminum oxide in the support is 1,000 or higher, the support contains 5 vol % or higher of particles having mesopores, the support has a pore distribution in which a peak value of pore sizes of the mesopores is 4.0 nm or less, and the catalytic noble metal is supported at least on the mesopores by ion exchange. Further, Japanese Patent Application Publication No. 2013-107055 (JP 2013-107055 A) discloses a catalyst support for purifying exhaust gas including: a porous body (A) that is formed of an oxide containing at least one element selected from the group consisting of Al, Ti, Zr, and Ce; and Si-based composite oxide particles (B) that are supported on the porous body (A) and contains at least one additive element selected from the group consisting of Ti, Fe, and Al, in which a specific surface area of the catalyst support after firing in air at 800° C. for 5 hours is 100 $m^2/g$ or more, and after the firing, a ratio of a pore volume of pores having a pore radius of 1 nm to 5 nm to a pore volume of pores having a pore radius of 1 nm to 100 nm is 8% to 50%. JP 2013-107055 A also discloses an exhaust gas purification catalyst including: the above-described catalyst support for purifying exhaust gas; and active metal particles (C) that are supported on the catalyst support and are formed of at least one element selected from the group consisting of Pt, Pd, Rh, Ir, Au, Ag, Cu, Co, Ni, V, Nb, Mo, and W.

However, recently, the requirements for an exhaust gas purification catalyst have increased, and an exhaust gas purification catalyst capable of exhibiting sufficient oxidation activity to carbon monoxide and hydrocarbon at a low temperature is required.

SUMMARY OF THE INVENTION

The invention has been made to provide an exhaust gas purification catalyst capable of exhibiting sufficient oxidation activity to carbon monoxide and hydrocarbon at a low temperature; a method of producing the same; and an exhaust gas purification method using the same.

The present inventors have found that sufficient oxidation activity to carbon monoxide (CO) and hydrocarbon (HC) at a low temperature can be exhibited using a method including: forming a silica layer on a surface of an alumina support; supporting active metal particles, which are formed of platinum and palladium, on a surface of the silica layer; adjusting a ratio of fine particles having a specific particle size to all the active metal particles to be a specific ratio; and adjusting a ratio of fine alloy particles having a specific palladium content ratio to all the fine particles to be a specific ratio. Based on this finding, the invention has been completed.

An exhaust gas purification catalyst according to a first aspect of the invention includes an alumina support; a silica layer that is formed on a surface of the alumina support; and active metal particles that are formed of platinum and palladium, the platinum and the palladium being supported on the silica layer. A ratio of fine particles having a particle size of 2.0 nm or less to all the active metal particles is 50% or higher in terms of the number of particles, the fine particles being included in the active metal particles. A ratio of fine alloy particles having a palladium content ratio of 10 at % to 90 at % to all the fine particles is 50% or higher in terms of the number of particles, the fine alloy particles being included in the fine particles.

In the first aspect of the invention, the ratio of the fine particles to all the active metal particles may be 90% or higher in terms of the number of particles. The ratio of the fine alloy particles to all the fine particles may be 80% or higher in terms of the number of particles.

In the first aspect of the invention, an average thickness of the silica layer may be 0.5 times to 2.5 times a thickness of a monolayer of alumina.

In the first aspect of the invention, an average particle size of the active metal particles may be 2.0 nm or less.

In the first aspect of the invention, a support amount of platinum may be 0.1 parts by mass to 10 parts by mass in terms of metal with respect to 100 parts by mass of the alumina support. A support amount of palladium may be 0.01 parts by mass to 5.0 parts by mass in terms of metal with respect to 100 parts by mass of the alumina support.

A method according to a second aspect of the invention is a method of producing an exhaust gas purification catalyst. The method includes: obtaining an alumina support including a silica layer by supporting silica on a surface of the alumina support using an organic silicon; supporting platinum and palladium on the alumina support including the silica layer using a solution of a platinum salt and a palladium salt; and obtaining the exhaust gas purification catalyst according to the first aspect of the invention by performing a heat treatment on the alumina support on which platinum and palladium are supported.

An exhaust gas purification method according to a third aspect of the invention includes purifying exhaust gas exhausted from an internal combustion engine by bringing the exhaust gas into contact with the exhaust gas purification catalyst according to the first aspect of the invention.

The reason why the exhaust gas purification catalyst according to the aspects of the invention can exhibit sufficiently high oxidation activity to CO and HC at a low temperature is not clear. However, the present inventors presume the reason to be as follows. In the aspects of the invention, the silica layer is formed on the surface of the alumina support, and the active metal particles formed of platinum and palladium are supported on the silica layer. By forming the silica layer on the surface of the alumina support, the surface of the support is acidified. As a result, an interaction between alumina and the active metal particles formed of platinum and palladium is weakened, and metalation of the active metal particles is promoted. As a result, catalytic activity is further improved.

In addition, in the aspects of the invention, a ratio of fine particles having a particle size of 2.0 nm or less to all the active metal particles is 50% or higher in terms of the number of particles. By using such fine active metal particles, low-temperature catalytic activity can be secured. Further, a ratio of fine alloy particles having a palladium content ratio of 10 at % to 90 at % to all the fine particles is 50% or higher in terms of the number of particles. By using the active metal particles formed of platinum (Pt) and palladium (Pd) in which the alloy content is high, low-temperature catalytic activity can be further improved. The present inventors presumed that, in the aspects of the invention, due to an interaction between the refining and the alloying of the active metal particles, self-poisoning (strong adsorption at a low temperature) of carbon monoxide (CO) and hydrocarbon (HC) on the exhaust gas purification catalyst is not likely to occur; as a result, sufficiently high oxidation activity to CO and HC at a low temperature can be exhibited.

According to the aspects of the invention, it is possible to provide an exhaust gas purification catalyst capable of exhibiting sufficient oxidation activity to carbon monoxide and hydrocarbon at a low temperature; a method of producing the same; and an exhaust gas purification method using the same.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 9A and 9B are schematic diagrams showing structures of exhaust gas purification catalysts, respectively, in which FIG. 9A is a schematic diagram showing a structure of an exhaust gas purification catalyst according to the present invention, and FIG. 9B is a schematic diagram showing a structure of an exhaust gas purification catalyst not including a silica layer.

DETAILED DESCRIPTION OF EMBODIMENTS

Figure 1:
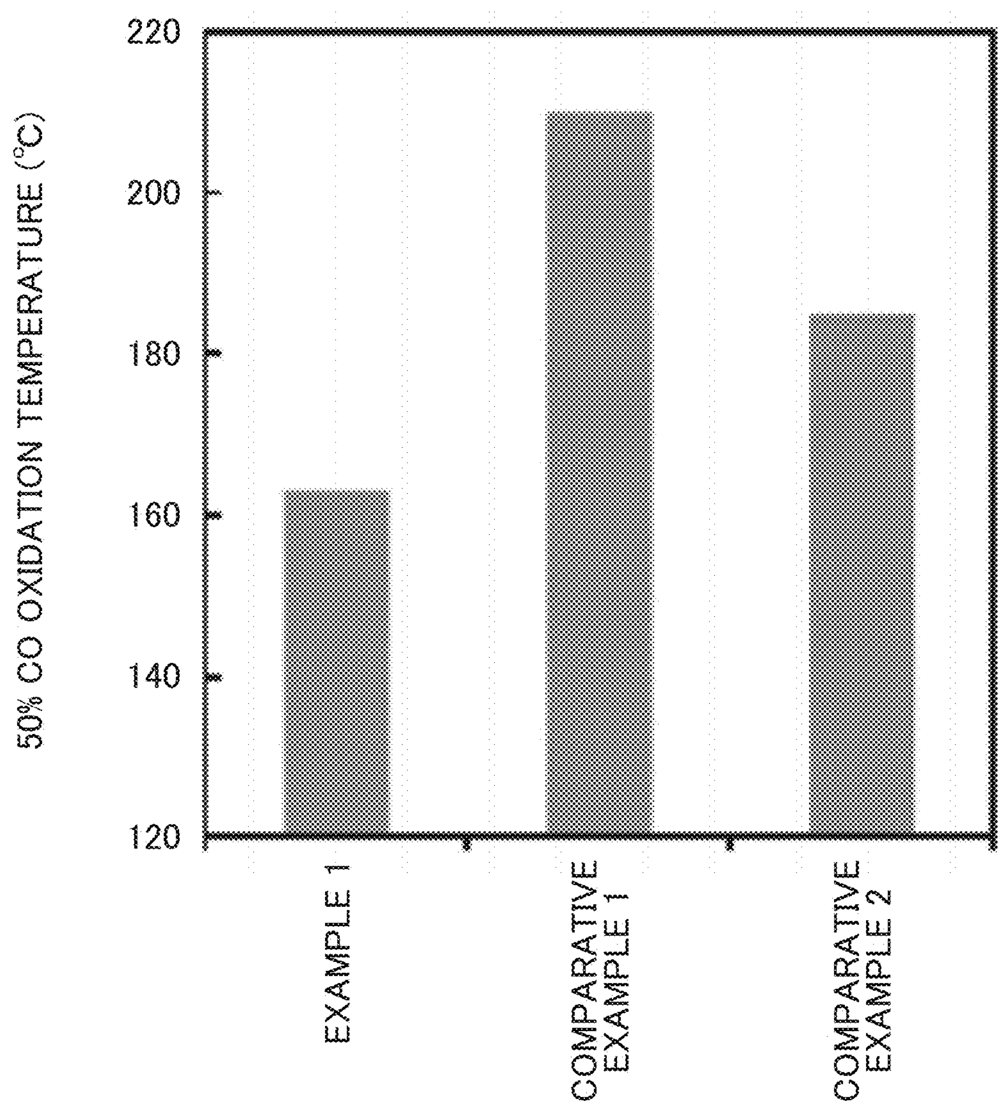
FIG. 1 is a graph showing the 50% CO oxidation temperatures of exhaust gas purification catalysts obtained in Example 1 and Comparative Examples 1 and 2.

Hereinafter, the invention will be described in detail using preferred embodiments thereof.

An exhaust gas purification catalyst according to an embodiment of the invention includes: an alumina support; a silica layer that is formed on a surface of the alumina support; and active metal particles that are formed of platinum and palladium supported on the silica layer, in which a ratio of fine particles having a particle size of 2.0 nm or less to all the active metal particles is 50% or higher in terms of the number of particles, and a ratio of fine alloy particles having a palladium content ratio of 10 at % to 90 at % to all the fine particles is 50% or higher in terms of the number of particles. By using this exhaust gas purification catalyst, more sufficient oxidation activity to carbon monoxide and hydrocarbon even at a low temperature can be exhibited.

(Alumina Support)

In the exhaust gas purification catalyst according to the embodiment of the invention, the support is necessarily an alumina support. Here, "the alumina support" used in the embodiment of the invention represents a support containing only alumina or a support containing alumina as a major component and further containing other components within a range where the effects of the invention are not impaired. As the other components, for example, various other metal oxides or additives which can be used in a support for the above-described application can be used. In the latter case, the content of alumina in the support is preferably 60 mass % or more and more preferably 80 mass % or more with respect to 100 mass % of the total mass of the support. When the content of alumina in the support is less than the lower limit, the catalytic activity decreases.

Alumina ($Al_2O_3$) in the support may be at least one alumina selected from the group consisting of boehmite alumina, pseudo-boehmite alumina, $\chi$-alumina, $\kappa$-alumina, $\rho$-alumina, $\eta$-alumina, $\gamma$-alumina, pseudo-$\gamma$-alumina, $\delta$-alumina, $\theta$-alumina, and $\alpha$-alumina. From the viewpoint of heat resistance, α-alumina or γ-alumina is preferably used, and γ-alumina having high activity is more preferably used.

In addition, the metal oxides used as the other components contained in the support are not particularly limited as long as they can be used in the support of the exhaust gas purification catalyst. From the viewpoints of the heat stability and the catalytic activity of the support, for example, oxides of metals, mixtures of the oxides of the metals, solid solutions of the oxides of the metals, and composite oxides of the metals can be appropriately used, the metals including: rare earth metals such as lanthanum (La), yttrium (Y), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), magnesium (Mg), calcium (Ca), strontium (Sr), barium (Ba), scandium (Sc), and vanadium (V); alkali metals; alkali earth metals; and transition metals. Further, the additives used as the other components are not particularly limited as long as they can be used in the support of the exhaust gas purification catalyst, and for example, $CeO_2$, $ZrO_2$, or $CeO_2$—$ZrO_2$ can be appropriately used.

In addition, the shape of the support of the exhaust gas purification catalyst according to the embodiment of the invention is not particularly limited and may be a well-known shape of the related art such as a ring shape, a spherical shape, a cylindrical shape, a particle shape, or a pellet shape. It is preferable that the support has a particle shape from the viewpoint of containing a large amount of active metal particles in a state having high dispersibility. When the support has a particle shape, the average particle size of the support is preferably 1.0 nm to 0.5 μm and more preferably 1.5 nm to 0.1 μm. When the average particle size of the alumina particles is more than the upper limit, particles of noble metal are likely to grow.

Further, the specific surface area of the support is not particularly limited, but is preferably 5 $m^2/g$ or more and more preferably 50 $m^2/g$ or more. When the specific surface area is less than the lower limit, the dispersibility of the active metal particles is decreased, and thus the catalytic performance (oxidation activity to CO and HC at a low temperature) decreases. In addition, the number of active sites in a reaction with CO, HC, and the like is decreased, and thus sufficiently high oxidation activity to CO and HC at a low temperature cannot be obtained. The specific surface area can be calculated from an adsorption isotherm as a BET specific surface area using a BET isotherm adsorption equation. This BET specific surface area can be obtained using a commercially available apparatus.

Further, a method of producing the support is not particularly limited, and a well-known method can be appropriately adopted. Further, as such a support, a commercially available product may be used.

(Silica Layer)

Next, the exhaust gas purification catalyst according to the embodiment of the invention includes a silica ($SiO_2$) layer that is formed on a surface of the alumina support. The average thickness of the silica ($SiO_2$) layer is not particularly limited, but is preferably 0.5 times to 2.5 times and more preferably 0.5 times to 1.5 times that of a monolayer of alumina ($Al_2O_3$, aluminum oxide). When the average thickness of the silica layer is less than the lower limit, the surface of the support cannot be sufficiently acidified, and thus it is difficult to promote the metalation of the active metal particles and to improve the catalytic activity. On the other hand, when the average thickness of the silica layer is more than the upper limit, the active metal particles aggregate.

Here, "the silica ($SiO_2$) layer that is formed on the surface of the alumina support" used in the embodiment of the invention represents the silica (SiO2) layer that is formed to cover the entire surface of the alumina support, or the silica (SiO2) layer that is formed to cover most part of the surface of the alumina support and not to cover the remaining part thereof within a range where the effects of the invention are not impaired. In the latter case, the coverage of the silica ($SiO_2$) layer is preferably 50% or more and more preferably 80% or more with respect to the area of the surface of the alumina support. When the coverage of the silica ($SiO_2$) layer on the support is less than the lower limit, the surface of the support cannot be sufficiently acidified, and it is difficult to promote the metalation of the active metal particles and to improve the catalytic activity. On the other hand, when the coverage of the silica (SiO2) layer on the support is more than the upper limit, the active metal particles excessively aggregate.

(Active Metal Particles)

Next, in the exhaust gas purification catalyst according to the embodiment of the invention, active metal particles formed of platinum (Pt) and palladium (Pd) are supported on the silica layer.

In addition, in the exhaust gas purification catalyst according to the embodiment of the invention, a ratio of fine particles having a particle size of 2.0 nm or less to all the active metal particles is necessarily 50% or higher in terms of the number of particles. When the ratio of the fine particles is lower than the lower limit, a ratio of fine particles having high oxidation activity is decreased, and thus sufficiently high oxidation activity to CO and HC at a low temperature cannot be obtained. In addition, in the active metal particles, the ratio of the fine particles is preferably 50% or higher and more preferably 80% or higher from the viewpoint of maintaining the dispersibility of the active metal. The particle size of the active metal particles can be obtained using, for example, a scanning electron microscope (SEM), a transmission electron microscope (TEM), or a scanning transmission electron microscope (STEM). Specifically, when the particle size of the active metal particles is obtained using a scanning transmission electron microscope (STEM), for example, the catalyst is observed using, for example, a scanning transmission electron microscope equipped with a spherical aberration corrector (Cs-STEM) on a convergence lens, two or more regions having a size of, for example, 10 nm×10 nm on the support are arbitrarily selected from the obtained STEM image to be observed, the particle sizes of active metal particles in the respective observation visual fields are obtained, and a ratio of fine particles is obtained in terms of number. The particle size described herein refers to, if a cross-section of a particle is not circular, the diameter of a minimum circumscribed circle thereof.

In addition, in the exhaust gas purification catalyst according to the embodiment of the invention, a ratio of fine alloy particles having a palladium content ratio of 10 at % to 90 at % to all the fine particles of the active metal particles is necessarily 50% or higher in terms of the number of particles. When the ratio of the fine alloy particles is lower than the lower limit, a ratio of fine particles having high oxidation activity is decreased, and thus sufficiently high oxidation activity to CO and HC at a low temperature cannot be obtained. In addition, the ratio of fine alloy particles having a palladium content ratio of 10 at % to 90 to all the fine particles is preferably 10% or higher and more preferably 20% or higher from the viewpoint of obtaining the alloy effect. The palladium content ratio or content can be obtained by composition analysis using, for example, an EDX (energy dispersive X-ray spectrometer) or a SIMS (secondary ion mass spectrometer). For example, by using, as a measuring device, a TEM-EDX spectrometer in which a well-known energy dispersive X-ray (EDX) spectrometer of the related art is mounted on a well-known transmission electron microscope (TEM) of the related art, two or more regions having a size of, for example, 10 nm×10 nm are arbitrarily selected from an arbitrary region to be observed, and the measurement points are analyzed to obtain the palladium content ratio or content. In addition, the palladium content ratio or content can also be measured using another method including: completely dissolving the exhaust gas purification catalyst in a dissolving liquid such as aqua regia; and analyzing the obtained solution using an ICP (inductively coupled plasma) analyzer. Specifically, for example, exhaust gas purification catalyst powder (for example, 0.5 g) is added and decomposed in aqua regia ([$HNO_3$]:[HCl]=1:3 (volume ratio)), and an sulfuric acid aqueous solution is added to this powder-decomposed solution to completely dissolve the catalyst. Next, the obtained solution is analyzed using an ICP analyzer (for example, "CIROS 120 EOP" manufactured by Rigaku Corporation). In the ICP analysis, the solution is introduced into argon plasma, the emission spectrum intensity of a measurement object (for example, palladium or platinum) is measured, the concentration of the measurement object metal (for example, palladium or platinum) in the solution is obtained using a calibration curve prepared in advance, and the content of the measurement object metal in the catalyst is calculated from the concentration of the measurement object metal.

Further, in the exhaust gas purification catalyst according to the embodiment of the invention, the support amount of the active metal particles formed of platinum (Pt) and palladium (Pd) is preferably 0.5 parts by mass to 10 parts by mass in terms of metal with respect to 100 parts by mass of the support. When the support amount of the active metal particles is less than the lower limit, sufficiently high oxidation activity to CO and HC at a low temperature cannot be obtained. On the other hand, when the support amount of the active metal particles is more than the upper limit, the dispersion degree of the active metal particles decreases, and sufficiently high oxidation activity to CO and HC at a low temperature cannot be obtained. In addition, the support amount of the active metal particles is more preferably 1.0 parts by mass to 8.0 parts by mass from the viewpoint of maintaining high dispersion degree of the active metal particles.

In addition, in the exhaust gas purification catalyst according to the embodiment of the invention, the average particle size of the active metal particles is preferably 2.0 nm or less. When the average particle size of the active metal particles is more than the upper limit, sufficiently high oxidation activity to CO and HC at a low temperature cannot be obtained. In addition, the average particle size of the active metal particles is more preferably 1.5 nm or less from the viewpoint of maintaining high dispersion degree of the active metal particles. The average particle size of the active metal particles can be obtained using a well-known CO chemical adsorption method of the related art. In addition, the average particle size of the active metal particles can be obtained by observing the catalyst using the Cs-STEM, arbitrarily selecting 10 or more platinum particles from the obtained STEM image, and measuring and averaging the particle sizes thereof.

Further, in the active metal particles in the exhaust gas purification catalyst according to the embodiment of the invention, the content of a Pt—Pd alloy is preferably 20 mass % or higher and more preferably 30 mass % or higher with respect to the total mass of the active metal particles. When the content of the Pt—Pd alloy is lower than the lower limit, sufficiently high oxidation activity to CO and HC at a low temperature cannot be obtained.

In the active metal particles of the exhaust gas purification catalyst according to the embodiment of the invention, the support amount of platinum (Pt) is preferably 0.1 parts by mass to 10 parts by mass in terms of metal with respect to 100 parts by mass of the support. When the support amount of platinum is less than the lower limit, sufficiently high oxidation activity to CO and HC at a low temperature cannot be obtained. On the other hand, when the support amount of platinum is more than the upper limit, sintering of platinum is likely to occur, and the dispersion degree of the active metal particles decreases, and sufficiently high oxidation activity to CO and HC at a low temperature cannot be obtained. In addition, the support amount of platinum is more preferably 1.0 parts by mass to 6.0 parts by mass from the viewpoint of securing low-temperature catalytic activity. In the active metal particles, the particle size of platinum is preferably 2.0 nm or less (more preferably 1.5 nm or less). When the particle sizes are more than the upper limit, the catalytic activity decreases. In addition, in the active metal particles, the particle size of platinum can be obtained, for example, by using a well-known CO chemical adsorption method of the related art or observing a STEM image with the Cs-STEM.

In addition, in the active metal particles, the support amount of palladium (Pd) is preferably 0.01 parts by mass to 5.0 parts by mass in terms of metal with respect to 100 parts by mass of the support. When the support amount of palladium is less than the lower limit, Pt particles excessively grow. On the other hand, when the support amount of palladium is more than the upper limit, Pd particles excessively grow. In addition, the support amount of palladium is more preferably 0.5 parts by mass to 3.0 parts by mass from the viewpoint of obtaining high refining and alloying effects of particles. This palladium may be supported as an oxide. In the active metal particles, the particle size of palladium is preferably 2.0 nm or less (more preferably 1.5 nm or less). When the particle sizes are more than the upper limit, the catalytic activity decreases. In addition, in the active metal particles, the particle size of palladium can be obtained, for example, by using a well-known CO chemical adsorption method of the related art or observing a STEM image with the Cs-STEM.

Further, in the exhaust gas purification catalyst according to the embodiment of the invention, the dispersion degree of the active metal of the active metal particles is preferably 5.0% or higher. When the dispersion degree of the active metal is lower than the lower limit, the catalytic activity decreases. In addition, the dispersion degree of the active metal is more preferably 10.0% or higher from the viewpoint of securing the catalytic activity. As a method of measuring the dispersion degree of the active metal particles, for example, a method of obtaining the dispersion degree from the CO adsorption amount and the support amount of the active metal particles can be used. The CO adsorption amount can be obtained, for example, using a gas adsorption amount measuring device according to a CO pulse measurement method. In addition, the dispersion degree (%) of the active metal particles can be calculated from the above-obtained CO adsorption amount and the support amount of the active metal particles using the following equation (1).

[Dispersion Degree (%) of Active Metal Particles]=([CO Adsorption Amount (mol) Adsorbed per 1 g of Catalyst]/[Support Amount (mol) of Active Metal Particles Adsorbed per 1 g of Catalyst])×100 (1)

In addition, the dispersion degree (%) of the active metal particles can be calculated from the above-obtained CO adsorption amount and the mass of the active metal particles using the following equation (2).

[Dispersion Degree (%) of Active Metal Particles]=([CO Adsorption Amount (ml) Adsorbed per 1 g of Catalyst]/[Mass (mass %) of Active Metal Particles Contained per 1 g of Catalyst])×100 (2)

By measuring the dispersion degree of the active metal particles as described above, a ratio of active sites of the active metal where the catalytic reaction works can be obtained. Using this dispersion degree of the active metal particles, the degree to which active metal components (for example, Pt, Pd, and a Pt—Pd alloy) are dispersed in the exhaust gas purification catalyst can be measured. For example, as the value of the dispersion degree of the active metal particles increases, the active metal components can be dispersed in the catalyst with high dispersibility.

Figure 9A:
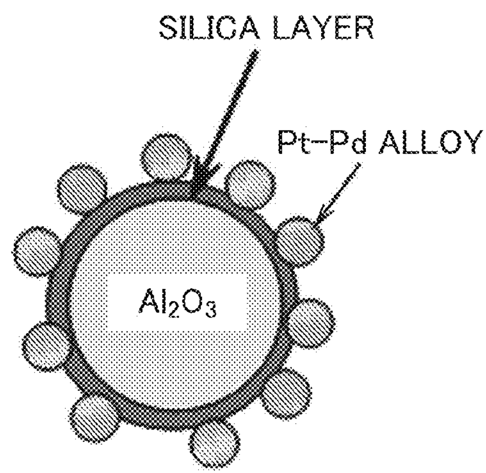
Figure 9B:
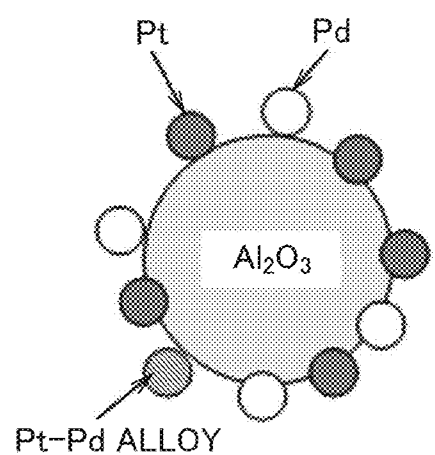

FIGS. 9A and 9B are schematic diagrams showing an embodiment of structures of exhaust gas purification catalysts, respectively. FIG. 9A is a schematic diagram showing an embodiment of a structure of the exhaust gas purification catalyst according to the present invention, in which a silica layer is formed (coated) on a surface of alumina ($Al2O_3$) which is the support, and Pt—Pd alloy particles which are the active metal particles are supported on a surface of the silica layer. FIG. 9B is a schematic diagram showing a structure of an exhaust gas purification catalyst not including a silica layer, in which Pt particles, Pd particles, and Pt—Pd alloy particles which are active metal particles are supported on a surface of alumina ($Al_2O_3$) which is a support (no silica layer is present).

The form of the exhaust gas purification catalyst according to the invention is not particularly limited. For example, the exhaust gas purification catalyst may adopt a form of a honeycomb-shaped monolith catalyst or a pellet-shaped pellet catalyst. Further, the exhaust gas purification catalyst may adopt a form in which a powdered catalyst is disposed at a target position as it is. A method of producing the exhaust gas purification catalyst having the above-described form is not particularly limited, and a well-known method can be appropriately used. For example, a method of forming a catalyst into a pellet shape to obtain a pellet-shaped exhaust gas purification catalyst or a method of coating a catalyst substrate with a catalyst to obtain an exhaust gas purification catalyst having a form in which the catalyst substrate is coated (fixed) with the catalyst may be appropriately adopted. The catalyst substrate is not particularly limited. For example, the catalyst substrate can be appropriately selected according to the use and the like of the obtained exhaust gas purification catalyst, and a monolith substrate, a pellet-shaped substrate, a plate-shaped substrate, or the like is preferably adopted. In addition, a material of the catalyst substrate is not particularly limited. For example, a substrate formed of a ceramic such as cordierite, silicon carbide, or mullite or a substrate formed of a metal such as stainless steel containing chromium and aluminum is preferably adopted. Further, the exhaust gas purification catalyst according to the embodiment of the invention may be used in combination with other catalysts. The other catalysts are not particularly limited, and well-known catalysts (for example, an oxidation catalyst, a NOx reduction catalyst (SCR catalyst) or a NOx storage reduction catalyst (storage reduction type NOx catalyst, NSR catalyst)) may be appropriately used.

[Method of Producing Exhaust Gas Purification Catalyst]

Next, a method of producing the exhaust gas purification catalyst according to the embodiment of the invention will be described. The method of producing the exhaust gas purification catalyst according to the embodiment of the invention includes: a step (silica layer forming step) of obtaining an alumina support including a silica layer by supporting silica on a surface of the alumina support using an organic silicon; a step (active metal particle supporting step) of supporting platinum and palladium on the surface of the alumina support including the silica layer using a solution of a platinum salt and a palladium salt; and a step (firing step) of obtaining the exhaust gas purification catalyst according to the embodiment of the invention by performing a heat treatment on the alumina support on which platinum and palladium are supported. By using this method, the exhaust gas purification catalyst according to the embodiment of the invention can be produced which is capable of exhibiting more sufficient oxidation activity to carbon monoxide and hydrocarbon even at a low temperature.

(Silica Layer Forming Step)

In the method of producing the exhaust gas purification catalyst according to the embodiment of the invention, an alumina support including a silica layer is obtained by supporting silica on a surface of the alumina support using an organic silicon (silica layer forming step).

The alumina support used in the silica layer forming step of the method according to the embodiment of the invention is not particularly limited. For example, alumina obtained by appropriately using a well-known alumina production method, or a commercially available alumina can be used. Examples of the alumina production method include a method of obtaining alumina by adding ammonia water to an aluminum nitrate solution to be neutralized and to obtain a precipitate, firing the precipitate at about 500° C. to 1200° C. for about 0.5 hours to 10 hours, and dry-pulverizing the fired precipitate. The shape of the alumina support is not particularly limited, and a well-known shape such as a ring shape, a spherical shape, a cylindrical shape, a particle shape or a pellet shape can be used. It is preferable that the support has a particle shape from the viewpoint of containing a large amount of active metal particles in a state having high dispersibility. When the support has a particle shape, the average particle size of the support is preferably 0.002 μm to 0.1 μm.

Next, in the silica layer forming step of the method according to the embodiment of the invention, an alumina support including a silica layer is obtained by supporting silica on a surface of the alumina support using an organic silicon.

The organic silicon used in the silica layer forming step is not particularly limited as long as it functions as a silica source of the silica layer, and preferable examples thereof include alkoxysilane and alkylalkoxysilane. Among these, from the viewpoint of coating the surface of the alumina support with a silica layer having a target thickness which has stable properties, an organic silicon which causes silica to be produced and precipitated through a hydrolysis reaction is preferable, and alkoxysilane is preferable.

The alkoxysilane is not particularly limited, and specific examples thereof include tetramethoxysilane [$Si(OCH_3)_4$], $Si(OC_2H_5)$, tetraethoxysilane [$Si(OC_2H_5)_4$, TEOS], tetrapropoxysilane [$Si(OC_3H_7)_4$], and tetrabutoxysilane [$Si(OC_4H_9)_4$]. In addition, other examples of the alkoxysilane include various alkylalkoxysilanes such as methyltrimethoxysilane, methyltriethoxysilane, dimethyldimethoxysilane, and dimethyldiethoxysilane. Among these, tetraethoxysilane (TEOS) is more preferable from the viewpoints of easily controlling the hydrolysis reaction and the amount of silica and promoting the uniform dispersion and precipitation of the target silica layer. In addition, the solvent is not particularly limited, and examples thereof include water (preferably pure water such as ion exchange water or distilled water) and alcohols such as ethanol. Further, in the hydrolysis, various additives including alkali such as ammonia (water), a structure controlling agent such as a surfactant, and an aggregation inhibitor can be appropriately added.

In addition, a method of supporting silica on the surface of the alumina support using an organic silicon in the silica layer forming step is not particularly limited, and examples thereof include a hydrolysis method using an organic silicon compound or the like, a sol-gel method, and a dissolution-reprecipitation method. Among these, a hydrolysis method using an organic silicon compound or the like is preferable from the viewpoint easily forming (preferably, coating or covering) a silica layer having a target thickness, which has stable properties, on the surface of the alumina support.

Specifically, when the hydrolysis method using an organic silicon compound or the like is used as the method of supporting silica on the surface of the alumina support using an organic silicon, first, an alumina particle dispersion such as an aqueous dispersion or alcohol suspension containing alumina particles is prepared. Next, a silica source such as a tetraethoxysilane compound or a silica source dispersion such as an alcohol solution containing the silica source is added to the alumina particle dispersion to hydrolyze the silane compound. The solution is stirred during the hydrolysis reaction. After completion of the hydrolysis reaction, the treated precipitate undergoes various treatments such as filtering, washing, drying, and firing. The above-described addition order of the alumina particle dispersion and the silica source dispersion may be reversed. In addition, in the hydrolysis reaction of the silane compound, any one of methods may be used, the methods including: a method of adjusting dispersions of the alumina support (or precursor particles thereof) as described above and the silica source and then hydrolyzing the silane compound in this dispersion; and a method of hydrolyzing each of the two dispersions in advance and then mixing both the dispersions with each other. Further, in the above-described example, the alumina support is formed of particulate alumina such as alumina particles, and the silica layer is formed on the alumina support. However, when the silica layer is formed on the alumina support having a ring shape, a spherical shape, a cylindrical shape, a particle shape, or a pellet shape, the silica layer can be formed on the surface of the alumina support by bringing the alumina support having the above-described shape into contact with the silica source dispersion prepared in advance. Through the above-described treatment operations, a predetermined amount of the silica layer can be formed on the surface of the alumina support.

(Active Metal Particle Supporting Step)

Next, in the method of producing the exhaust gas purification catalyst according to the embodiment of the invention, platinum (Pt) and palladium (Pd) are supported on the alumina support including the silica layer on the surface thereof, which is obtained in the silica layer forming step, using a solution of a platinum salt and a palladium salt (active metal particle supporting step).

The solution of a platinum salt and a palladium salt used in the active metal particle supporting step of the method according to the embodiment of the invention is not particularly limited. Examples of the platinum salt include acetates, carbonate, nitrates, ammonium salts, and citrates of platinum (Pt) and complexes thereof. The palladium salt is not particularly limited, and examples thereof include acetates, carbonate, nitrates, ammonium salts, and citrates of palladium (Pd) and complexes thereof. Further, the solvent is not particularly limited, and examples thereof include solvents, such as water (preferably, pure water such as ion exchange water or distilled water), in which a platinum salt and a palladium salt can be ionically dissolved. In addition as the solution of a platinum salt and a palladium salt, a mixed solution containing a platinum salt and a palladium salt may be used. The concentration of the solution of a platinum salt and a palladium salt is not particularly limited. In order to support the active metal as fine particles, the amount of a solvent (for example, water) used is preferably 20 times to 40 times and more preferably 30 times to 40 times the amount of the support.

In addition, the method of supporting platinum (Pt) and palladium (Pd) on the support using the solution of a platinum salt and a palladium salt is not particularly limited, and a well-method can be appropriately adopted, the well-known method including: a method of impregnating the support with the solution of a platinum salt and a palladium salt; and a method of causing the solution of a platinum salt and a palladium salt to be adsorbed and supported on the support. As the method of bringing the support into contact (for example, by impregnation or adsorption) with the solution of a platinum salt and a palladium salt, any one of methods may be used, the methods including: a method of individually preparing a solution containing a platinum salt and a solution containing a palladium salt, bringing the support into contact with the solution containing a platinum salt (or the solution containing a palladium salt), and then bringing the support into contact with the solution containing a palladium salt (or the solution containing a platinum salt) which is the other salt solution; and a method of simultaneously bringing the support into contact with the solution containing a platinum salt and the solution containing a palladium salt (which may be a solution containing a platinum salt and a palladium salt).

Further, when the solution of a platinum salt and a palladium salt is supported on the support, the support amount of platinum and palladium supported on the alumina particles in the solution of a platinum salt and a palladium salt is preferably 0.1 parts by mass to 15 parts by mass and more preferably 1.0 part by mass to 12 parts by mass in terms of metal with respect to 100 parts by mass of the support. When the support amount of platinum and palladium is less than the lower limit, the catalytic activity is insufficient. On the other hand, when the support amount of platinum and palladium is more than the upper limit, sintering of the active metal particles occurs. From the viewpoint of securing the catalytic activity, the support amount of platinum is preferably 0.1 parts by mass to 10 parts by mass and more preferably 1.0 part by mass to 8.0 parts by mass in terms of metal with respect to 100 parts by mass of the support. In addition, from the viewpoint of obtaining refining and alloying effects of the active metal particles, the support amount of palladium is preferably 0.1 parts by mass to 5.0 parts by mass and more preferably 0.5 parts by mass to 4.0 parts by mass in terms of metal with respect to 100 parts by mass of the support.

In addition, the active metal particles are supported on the support and then are optionally dried. A specific drying method is not particularly limited, and a well-known method can be appropriately adopted. For example, a natural drying method, an evaporation drying method, and a drying method using a rotary evaporator or a fan drying machine may be adopted. The drying temperature and drying time are not particularly limited and can be appropriately selected according to the desired design and the like. For example, drying can be performed in a temperature range of 80° C. to 150° C. for about 2 hours to 48 hours. In some cases, drying may be performed by heating in the next step without performing the drying step.

(Firing Step)

Next, in the method of producing the exhaust gas purification catalyst according to the embodiment of the invention, the exhaust gas purification catalyst according to the embodiment of the invention is obtained by performing a heat treatment on the alumina support (active metal particle-supported support), on which platinum and palladium are supported, which is obtained in the active metal particle supporting step (firing step).

In the firing step of the method of producing the exhaust gas purification catalyst according to the embodiment of the invention, it is preferable that the support (active metal particle-supported support) on which platinum and palladium are supported is fired in a temperature range of 400° C. to 800° C. When the firing temperature is lower than the lower limit, the obtained sintered compact cannot exhibit sufficiently high oxidation activity to CO and HC at a low temperature. On the other hand, when the firing temperature is higher than the upper limit, support particles excessively grow. From the viewpoint of securing the catalytic activity, the firing temperature is more preferably in a temperature range of 400° C. to 600° C. In addition, the firing (heating) time is preferably 3 hours to 20 hours and more preferably 4 hours to 15 hours although it varies depending on the firing temperature. Further, an atmosphere in the firing step is not particularly limited, but is preferably air or an inert gas such as nitrogen ($N_2$).

[Exhaust Gas Purification Method]

Next, an exhaust gas purification method according to an embodiment of the invention will be described. The exhaust gas purification method according to the embodiment of the invention includes: purifying exhaust gas exhausted from an internal combustion engine by bringing the exhaust gas into contact with the exhaust gas purification catalyst according to the embodiment of the invention.

In the exhaust gas purification method according to the embodiment of the invention, a method of bringing exhaust gas into contact with the exhaust gas purification catalyst is not particularly limited, and a well-known method can be appropriately used. For example, a method may be adopted, the method including: bringing exhaust gas exhausted from an internal combustion engine into contact with the exhaust gas purification catalyst according to the embodiment of the invention by disposing the exhaust gas purification catalyst inside an exhaust gas pipe through which gas exhausted from an internal combustion engine flows.

The exhaust gas purification catalyst according to the embodiment of the invention used in the exhaust gas purification method according to the embodiment of the invention exhibits sufficient oxidation activity to carbon monoxide (CO) and hydrocarbon (HC) even at a low temperature. Therefore, by bringing the exhaust gas purification catalyst according to the embodiment of the invention into contact with exhaust gas exhausted from an internal combustion engine such as a diesel engine, CO and HC in the exhaust gas can be sufficiently purified. From this point of view, the exhaust gas purification method according to the embodiment of the invention can be suitably adopted, for example, as a method of purifying CO and HC in exhaust gas exhausted from an internal combustion engine such as a diesel engine.

Hereinafter, the invention will be described in more detail using Examples and Comparative Examples but is not limited to the following Examples.

EXAMPLE 1

First, 20 g of alumina powder ("MI307", manufactured by W. R. Grace & Co.-Conn., specific surface area: 100 $m^2/g$, average particle size: 10 nm) was added to 200 ml of distilled water, and the obtained solution was heated and stirred at 50° C. for 30 minutes. As a result, an alumina powder dispersion was obtained.

Next, $Si(OC_2H_5)$ (23.3 g) was added to the obtained alumina powder dispersion and was stirred for 10 minutes. $NH_3$ (28%, 5 ml) aqueous solution was added and stirred for 30 minutes. Further, the obtained solution was heated and stirred at 110° C. to be evaporated to dryness. As a result, a coagulated material was obtained (evaporation drying). Next, the obtained coagulated material was heated and fired in air under conditions of 500° C. and 5 hours. As a result, a $SiO_2$—$Al_2O_3$ support including a silica layer on a surface of the alumina powder was obtained. The average thickness of the $SiO_2$ layer of the $SiO_2$—$Al_2O_3$ support is 0.67 times a thickness of a monolayer of alumina.

Next, 20 g of the obtained alumina support including the silica layer on the surface was added to a mixed solution of dinitro diammine platinum nitrate aqueous solution (0.05 mon) and palladium nitrate aqueous solution (0.05 mol/L). The mixed solution was impregnated and supported on the alumina support such that the support amount of platinum was 1.0 mass % and the support amount of palladium was 0.5 mass % with respect to 100 mass % of the alumina powder. The obtained solution was heated and stirred at 110° C. for 300 minutes to be evaporated to dryness. As a result, a coagulated material was obtained (evaporation drying). Next, the obtained coagulated material was heated and fired in air under conditions of 550° C. and 5 hours. Next, the obtained fired material was pressure-formed and pulverized. As a result, a pellet-shaped exhaust gas purification catalyst having a diameter of 0.5 mm to 1 mm was obtained.

COMPARATIVE EXAMPLE 1

A mixed solution of dinitro diammine platinum nitrate aqueous solution (0.05 mol/L) and palladium nitrate aqueous solution (0.05 mol/L) was impregnated and supported on 20 g of a commercially available alumina powder ("MI307", manufactured by W. R. Grace & Co.-Conn., specific surface area: 100 $m^2/g$, average particle size: 10 nm) such that the support amount of platinum was 1.0 mass % and the support amount of palladium was 0.5 mass % with respect to 100 mass % of the alumina powder. The obtained solution was heated and stirred at 110° C. for 300 minutes to be evaporated to dryness. As a result, a coagulated material was obtained (evaporation drying). Next, the obtained coagulated material was heated and fired in air under conditions of 550° C. and 5 hours. Next, the obtained fired material was pressure-formed and pulverized. As a result, a pellet-shaped comparative catalyst having a diameter of 0.5 mm to 1 mm was obtained.

COMPARATIVE EXAMPLE 2

A mixed solution of dinitro diammine platinum nitrate aqueous solution (0.05 mol/L) and palladium nitrate aqueous solution (0.05 mol/L) was impregnated and supported on 20 g of a commercially available silica powder ("90G", manufactured by Nippon Aerosil Co., Ltd., specific surface area: 90 $m^2$/g, average particle size: 12 nm) such that the support amount of platinum was 1.0 mass % and the support amount of palladium was 0.5 mass % with respect to 100 mass % of the silica powder. The obtained solution was heated and stirred at 110° C. for 300 minutes to be evaporated to dryness. As a result, a coagulated material was obtained (evaporation drying). Next, the obtained coagulated material was heated and fired in air under conditions of 550° C. and 5 hours. Next, the obtained fired material was pressure-formed and pulverized. As a result, a pellet-shaped comparative catalyst having a diameter of 0.5 mm to 1 mm was obtained.

<Catalytic Activity Evaluation Test>

Regarding the exhaust gas purification catalyst obtained in Example 1 and the comparative catalysts obtained in Comparative Examples 1 and 2, the oxidation performance of each catalyst was measured.

First, using a fixed bed flow reactor (manufactured by Best Sokki, Ltd.), the following treatment (pre-treatment) was performed in which: a quartz reaction tube having an inner diameter of 15 mm was filled with the obtained pellet-shaped catalyst sample; the temperature of intake gas flowing to the catalyst was increased to 300° C. at a temperature increase rate of 10° C./min while supplying model gas containing $CO_2$ (10 vol %), $O_2$ (10 vol %), CO (800 ppm), $C_3H_6$ (400 ppmC), NO (100 ppm), $H_2O$ (5 vol %), and $N_2$ (remainder) to the catalyst at a flow rate of 7 L/min in terms of $N_2$; and the quartz reaction tube was heated at 300° C. for 5 minutes and then cooled until the bed temperature of the catalyst (the temperature of intake gas flowing to the catalyst) was 100° C.

Next, after the treatment, the temperature of intake gas flowing to the catalyst was increased from 100° C. to 500° C. at a temperature increase rate of 10° C./min while supplying the model gas to the catalyst at a flow rate of 7 L/min in terms of $N_2$. During this temperature increase, the CO concentration of gas emitted from the catalyst (gas emitted from the quartz reaction tube after contact with the catalyst) was measured using a continuous gas analyzer, and a CO conversion (oxidation) ratio was calculated from the CO concentration in the model gas and the CO concentration in the emitted gas. At this time, a temperature at which the CO conversion (oxidation) ratio reached 50% was obtained as a 50% CO oxidation temperature (° C.). Likewise, a temperature at which the HC ($C_3H_6$) conversion (oxidation) ratio reached 50% was obtained as a 50% HC oxidation temperature (° C.).

Figure 2:
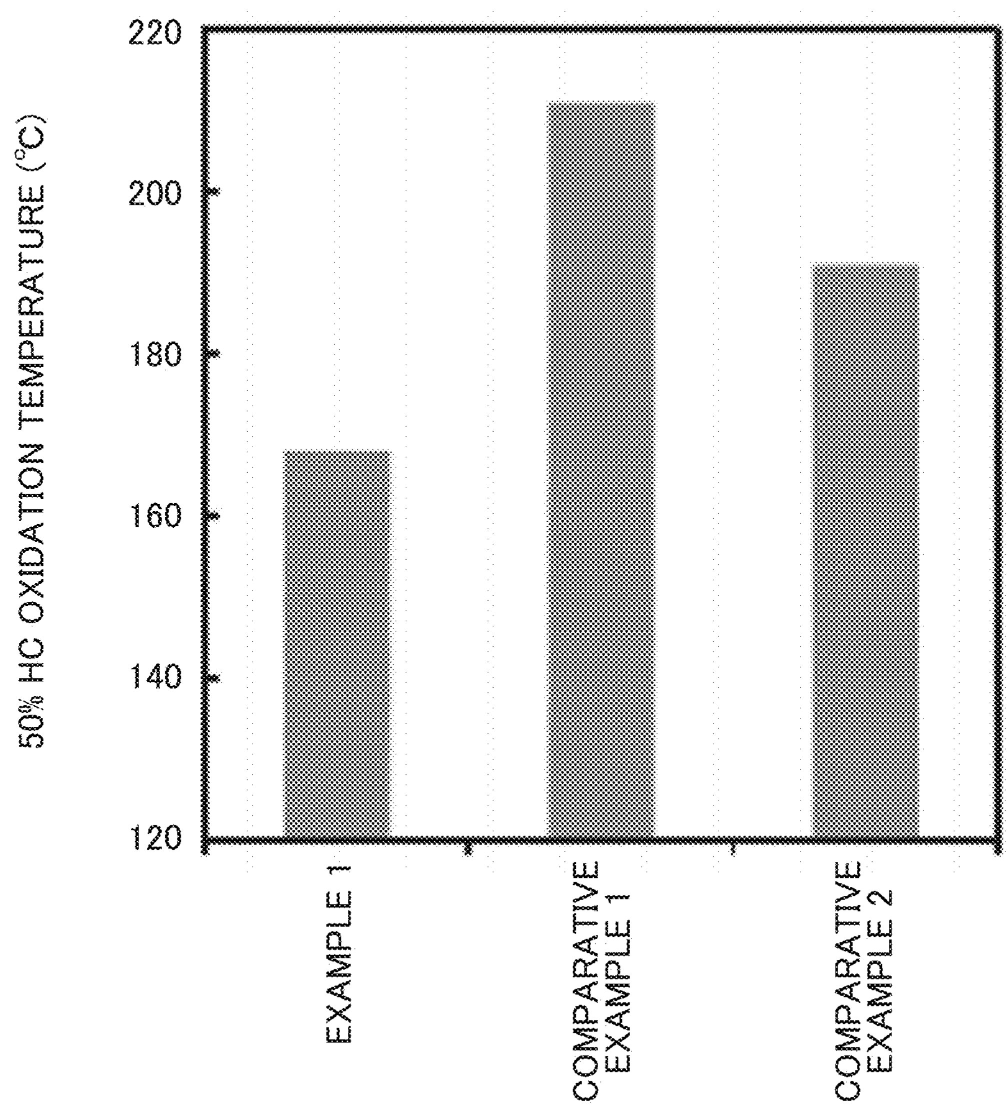
FIG. 2 is a graph showing the 50% HC oxidation temperatures of the exhaust gas purification catalysts obtained in Example 1 and Comparative Examples 1 and 2.

The obtained results are shown in FIGS. 1 and 2. FIG. 1 is a graph showing the 50% CO oxidation temperatures of the exhaust gas purification catalyst obtained in Example 1 and the comparative catalysts obtained in Comparative Examples 1 and 2. FIG. 2 is a graph showing the 50% HC oxidation temperatures of the exhaust gas purification catalyst obtained in Example 1 and the comparative catalysts obtained in Comparative Examples 1 and 2.

As clearly seen from the results shown in FIGS. 1 and 2, it was verified that the exhaust gas purification catalyst of Example 1 exhibited high CO oxidation activity and high HC oxidation activity at the 50% CO oxidation temperature and the 50% HC oxidation temperature.

<STEM Observation Test>

Regarding the exhaust gas purification catalyst obtained in Example 1 and the comparative catalysts obtained in Comparative Examples 1 and 2, each catalyst sample was observed under the following conditions using a scanning transmission electron microscope equipped with a spherical aberration corrector (Cs-STEM, "HD-2700" manufactured by Hitachi, Ltd.).

[Observation Conditions]

Electron gun: thermal field emission type

Accelerating voltage: 200 kV at a maximum

Lattice resolution (lattice image): 0.1 nm

Point resolution (particle image): 0.19 nm

STEM resolution: 0.2 nm

Magnification: 150,000,000 times (variable to an appropriate magnification for the measurement)

X-ray detector solid angle: 0.24 sr (the unit sr represents steradian; solid angle at the center of a sphere subtended by a part of the surface equal in area to the square of the radius).

FIGS. 3 to 8 are scanning transmission electron microscope (STEM) images of the respective catalyst materials obtained from the scanning transmission electron microscopy.

Figure 3:
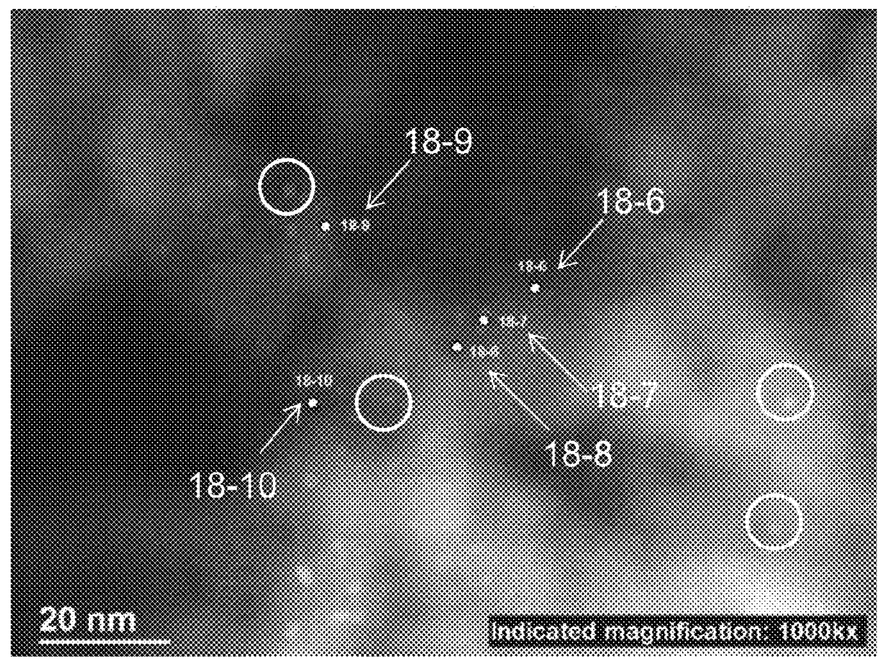
FIG. 3 is a scanning transmission electron microscope (STEM) image showing a state of a specific region on a surface of the exhaust gas purification catalyst obtained in Example 1.
Figure 4:
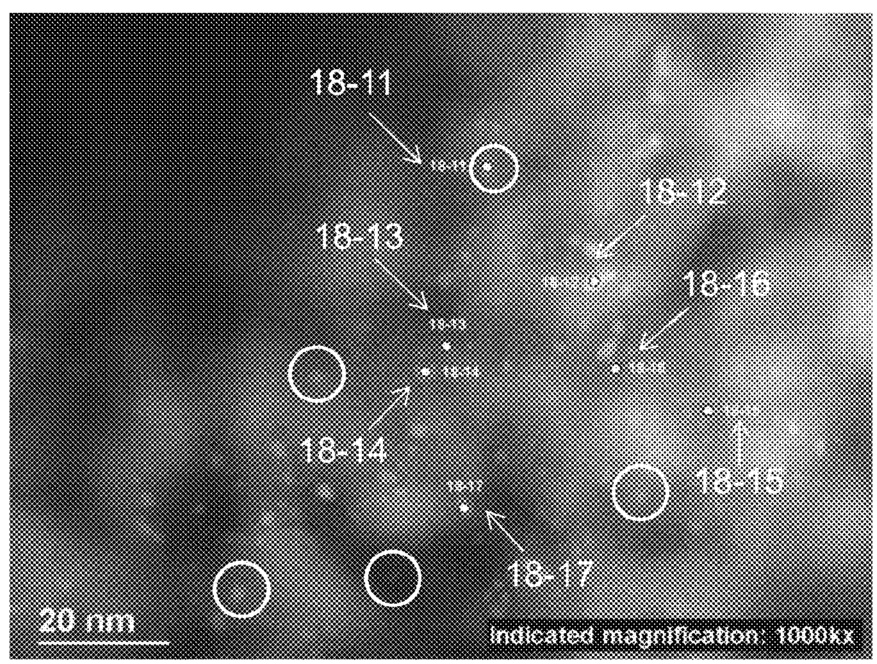
FIG. 4 is a scanning transmission electron microscope (STEM) image showing a state of another specific region on the surface of the exhaust gas purification catalyst obtained in Example 1.

FIGS. 3 and 4 are STEM images of the exhaust gas purification catalyst obtained in Example 1. It was verified that: in FIGS. 3 and 4, all the white spots were Pt—Pd particles, and regions surrounded by a white line were Pt—Pd particles; and Pt—Pd particles having a particle size of 2.0 nm or less were present. In addition, a region having a size of 200 nm×260 nm was arbitrarily selected from the STEM image, and all the metal particles present in this region were examined in detail. In this examination, all the metal particles were Pt—Pd alloy particles as active metal particles, and the number of metal particles was 196. Further, the number of fine particles (Pt—Pd fine particles) having a particle size of 2.0 nm or less among all the active metal particles was 191, and a ratio (in terms of the number of particles) of the fine particles to all the active metal particles was 97.4%. Further, 20 fine particles were arbitrarily selected from among the 191 fine particles, and the arbitrarily selected 20 fine particles were examined in detail. In this examination, a ratio (in terms of the number of particles; %) of fine alloy particles having a palladium content ratio of 10 at % to 90 at % to the 20 fine particles was 90.0% (a ratio of fine alloy particles having a palladium content ratio of 10 at % to 30 at % to the 20 fine particles was also 90.0%).

Figure 5:
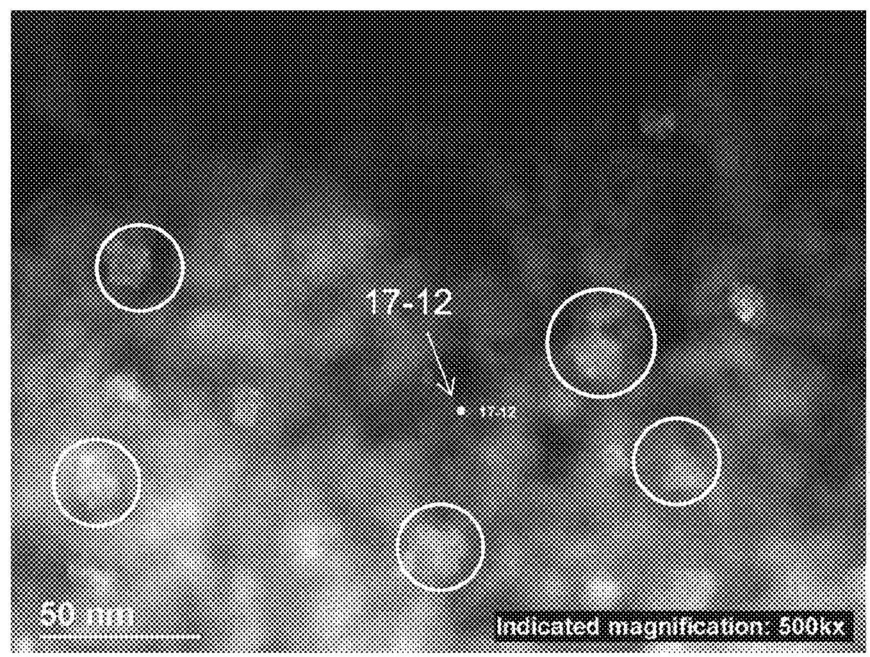
FIG. 5 is a scanning transmission electron microscope (STEM) image showing a state of a specific region on a surface of the comparative catalyst obtained in Comparative Example 1.
Figure 6:
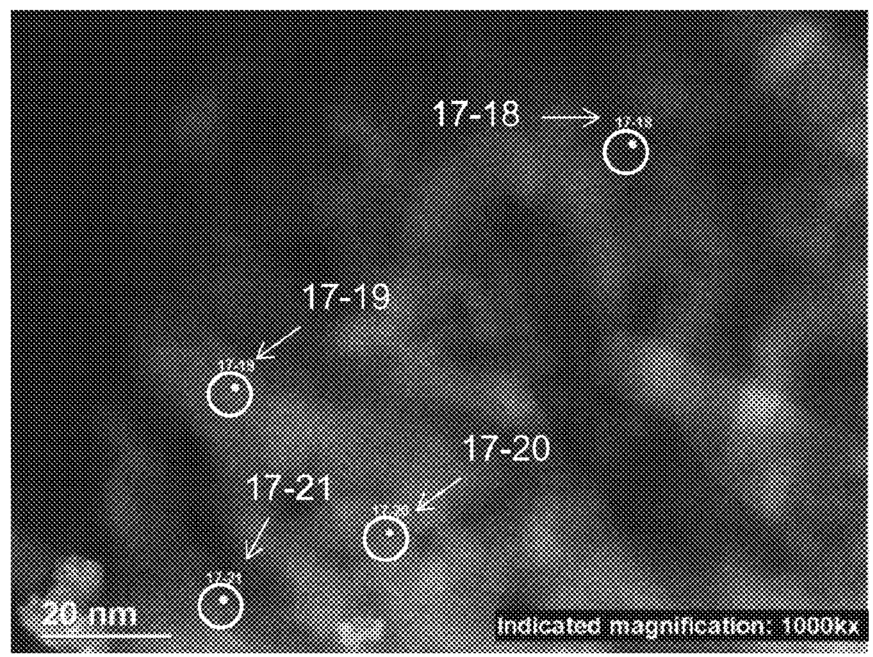
FIG. 6 is a scanning transmission electron microscope (STEM) image showing a state of another specific region on the surface of the comparative catalyst obtained in Comparative Example 1.

FIGS. 5 and 6 are STEM images of the comparative catalyst obtained in Comparative Example 1. It was verified that: in FIGS. 5 and 6, the white spots were metal particles including Pt particles, Pd particles, and Pt—Pd alloy particles, regions surrounded by a white line were Pt—Pd particles; and active metal particles including Pt particles, Pd particles, and Pt—Pd alloy particles were present. In addition, a region having a size of 200 nm×260 nm was arbitrarily selected from the STEM image, and all the metal particles present in this region were examined in detail. In this examination, the total number of metal particles was 32 (all the metal particles were active metal particles), the number of fine particles having a particle size of 2.0 nm or less among all the active metal particles was 4, and a ratio (in terms of the number of particles) of the fine particles to all the active metal particles was 12.5%. Further, the four fine particles having a particle size of 2.0 nm or less were examined in detail. In this examination, a ratio (in terms of the number of particles; %) of fine alloy particles having a palladium content ratio of 10 at % to 90 at % to the four fine particles was 0.0% (a ratio of fine alloy particles having a palladium content ratio of 10 at % to the four fine particles was also 0.0%).

Figure 7:
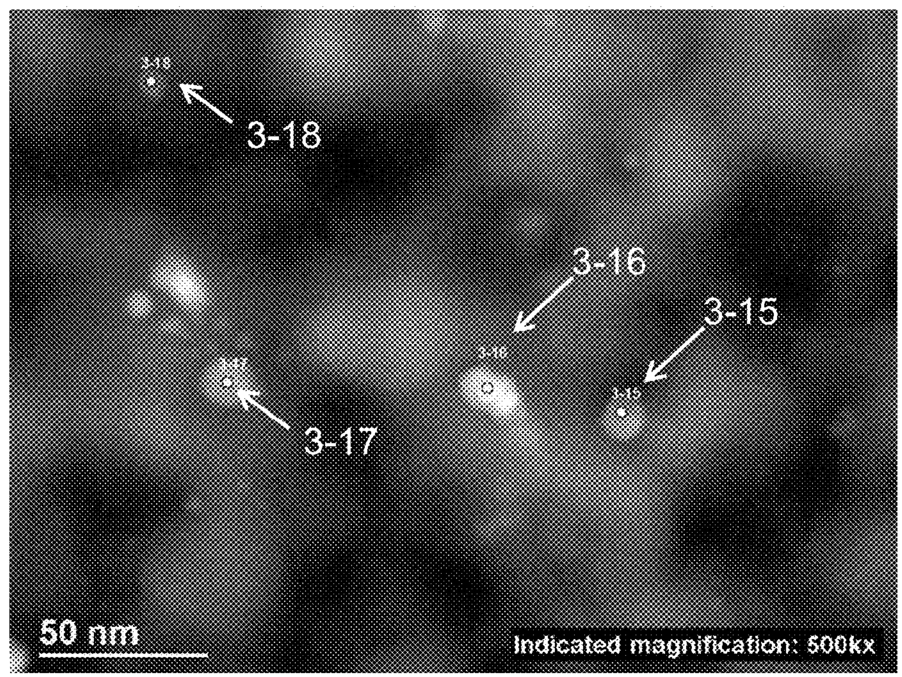
FIG. 7 is a scanning transmission electron microscope (STEM) image showing a state of a specific region on a surface of the comparative catalyst obtained in Comparative Example 2.
Figure 8:
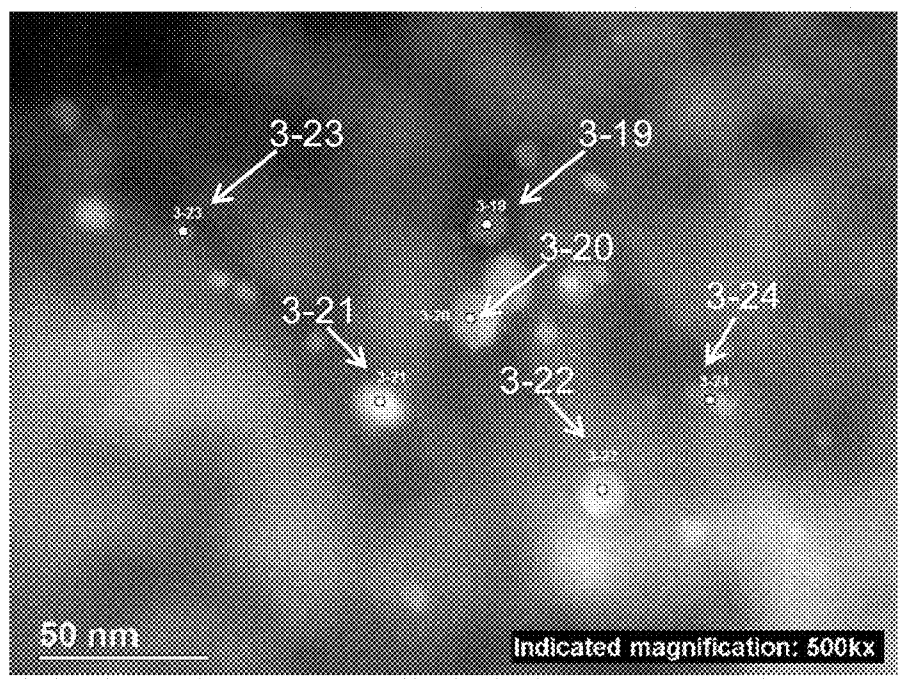
FIG. 8 is a scanning transmission electron microscope (STEM) image showing a state of another specific region on the surface of the comparative catalyst obtained in Comparative Example 2.

FIGS. 7 and 8 are STEM images of the comparative catalyst obtained in Comparative Example 2. It was verified that: in FIGS. 7 and 8, the white spots were metal particles including Pt particles, Pd particles, and Pt—Pd alloy particles; and active metal particles including Pt particles, Pd particles, and Pt—Pd alloy particles were present. In addition, a region having a size of 200 nm×260 nm was arbitrarily selected from the STEM image, and all the metal particles present in this region were examined in detail. In this examination, the total number of metal particles was 64 (all the metal particles were active metal particles), the number of fine particles having a particle size of 2.0 nm or less among all the active metal particles was 5, and a ratio (in terms of the number of particles) of the fine particles to all the active metal particles was 7.8%. Further, the five fine particles having a particle size of 2.0 nm or less were examined in detail. In this examination, a ratio (in terms of the number of particles; %) of fine alloy particles having a palladium content ratio of 10 at % to 90 at % to the five fine particles was 20.0% (a ratio of fine alloy particles having a palladium content ratio of 10 at % to 20 at % to the five fine particles was also 20.0%).

Regarding the exhaust gas purification catalyst obtained in Example 1 and the comparative catalysts obtained in Comparative Examples 1 and 2, the number of all the active metal particles, the number of fine particles having a particle size of 2 nm or less among all the active metal particles, the ratio (in terms of the number of particles; %) of the fine particles (having a particle size of 2 nm or less) to all the active metal particles, and the ratio (in terms of the number of particles; %) of the fine alloy particle having a palladium content ratio of 10 at % to 90 at % to all the fine particles were obtained, and the results thereof are shown in Table 1.

TABLE 1

| | Number of All Active metal Particles | Number of Fine Particles (Having Particle Size of 2 nm or Less) | Ratio (%) of Fine Particles to All Active Metal Particles | Ratio (%) of Fine Alloy Particles Having Pd Content Ratio of 10 at % to 90 at % to All Fine Particles |
|---|---|---|---|---|
| Example 1 | 196 | 191 | 97.4 | 90.0 |
| Comparative Example 1 | 32 | 4 | 12.5 | 0.0 |
| Comparative Example 2 | 64 | 5 | 7.8 | 20.0 |

In addition, the particle sizes (nm) and the palladium content ratios (at %) of the 20 fine particles arbitrarily selected in Example 1 were obtained, and the results thereof are shown in Table 2. Particle Nos. 1-6 to 1-17 in Table 2 correspond to Particle Nos. 18-6 to 18-17 in FIGS. 3 and 4, respectively. Particle Nos. 18-1 to 18-5, and Particle Nos. 18-18 to 18-20 are omitted in FIGS. 3 and 4.

TABLE 2

| Particle No. | Particle Size (nm) | Palladium Content Ratio (at %) |
|---|---|---|
| 1-1 | 1.90 | 21.66 |
| 1-2 | 1.80 | 10.90 |
| 1-3 | 2.00 | 27.48 |
| 1-4 | 1.80 | 20.71 |
| 1-5 | 1.70 | 12.16 |
| 1-6 | 0.70 | 2.03 |
| 1-7 | 1.50 | 10.82 |
| 1-8 | 0.80 | 12.56 |

TABLE 2-continued

| Particle No. | Particle Size (nm) | Palladium Content Ratio (at %) |
|---|---|---|
| 1-9 | 1.50 | 10.42 |
| 1-10 | 0.80 | 10.01 |
| 1-11 | 1.50 | 14.01 |
| 1-12 | 1.70 | 10.34 |
| 1-13 | 0.80 | 13.14 |
| 1-14 | 1.90 | 13.22 |
| 1-15 | 1.40 | 10.69 |
| 1-16 | 0.80 | 16.28 |
| 1-17 | 1.30 | 5.21 |
| 1-18 | 1.80 | 10.56 |
| 1-19 | 1.60 | 21.30 |
| 1-20 | 1.60 | 12.39 |

Further, the particle sizes (nm) and the palladium content ratios (at %) of the fine particles obtained in Comparative Example 1 were obtained, and the results thereof are shown in Table 3. Particle Nos. C1-1 to C1-4 in Table 3 correspond to Particle Nos. 17-18 to 17-21 in FIG. 6, respectively.

TABLE 3

| Particle No. | Particle Size (nm) | Palladium Content Ratio (at %) |
|---|---|---|
| C1-1 | 1.00 | 0.00 |
| C1-2 | 1.00 | 0.64 |
| C1-3 | 1.00 | 5.76 |
| C1-4 | 1.00 | 1.05 |

In addition, the particle sizes (nm) and the palladium content ratios (at %) of the fine particles obtained in Comparative Example 2 were obtained, and the results thereof are shown in Table 4. Particle Nos. C2-1 to C2-5 in Table 4 are omitted in FIGS. 7 and 8.

TABLE 4

| Particle No. | Particle Size (nm) | Palladium Content Ratio (at %) |
|---|---|---|
| C2-1 | 1.00 | 5.04 |
| C2-2 | 1.40 | 6.54 |
| C2-3 | 1.50 | 7.72 |
| C2-4 | 1.00 | 2.35 |
| C2-5 | 1.30 | 14.16 |

<Measurement of Average Particle Size of Pt—Pd Alloy>

Regarding the exhaust gas purification catalyst obtained in Example 1 and the comparative catalysts obtained in Comparative Examples 1 and 2, the average particle size of the active metal particles (Pt—Pd alloy, Pt, or Pd) was obtained using a CO chemical adsorption method. The obtained results are shown in Table 5.

<Measurement of CO Adsorption Amount>

The CO adsorption amounts of the exhaust gas purification catalyst obtained in Example 1 and the comparative catalysts obtained in Comparative Examples 1 and 2 were obtained using the following CO pulse measurement method.

That is, first, each of the obtained catalyst samples was placed in a region (intermediate portion) of a test gas pipe at a length of 54.5 cm from the upstream side to the downstream side of gas flow, the test gas pipe having an inner diameter of 1.1 cm and a length of 100 cm. Next, at a temperature of 1,000° C., rich gas containing $H_2$ (2 vol %), $CO_2$ (10 vol %), $H_2O$ (3 vol %), and $N_2$ (remainder) and lean gas containing $O_2$ (1 vol %), $CO_2$ (10 vol %), $H_2O$ (3 vol %), and $N_2$ (remainder) were alternately supplied on a 1-minute basis so as to flow at a flow rate of 200 ml/min per 0.3 g of the pellet catalyst sample. This treatment was continued for 50 hours to perform a durability test.

Next, after the durability test, the pellet catalyst sample was weighed at three quantities of 0.03 g, 0.04 g, and 0.05, and each quantity of pellet catalyst sample was placed inside a measuring tube of a gas adsorption amount measuring device ("R6015", manufactured by Ohkurariken Co., Ltd.). The inside of the measuring tube was filled with a gas atmosphere of O2 (100 vol %), was heated to 400° C. for 40 minutes, and was held at 400° C. for 15 minutes. Next, the internal gas atmosphere of each measuring tube was replaced with a gas atmosphere of He (100 vol %) and was held at 400° C. for 40 minutes. Next, the internal gas atmosphere of each measuring tube was replaced with a gas atmosphere of $H_2$ (100 vol %) and was held at 400° C. for 15 minutes. Next, the internal gas atmosphere of each measuring tube was replaced with a gas atmosphere of He (100 vol %) and was held at 400° C. for 15 minutes. Then, the measuring tube was naturally cooled to 50° C. while being held at the gas atmosphere of He (100 vol %). Next, while maintaining the temperature at 50° C. (constant) in the gas atmosphere of He (100 vol %), CO was pulsed over each quantity of the catalyst at 1.0 μmol/pulse until the adsorption was saturated (adsorption temperature: 50° C.). The amount of a portion of the pulsed CO not adsorbed on the catalyst was detected using a thermal conductivity detector (TCD), and the CO adsorption amount of each quantity of the catalyst was measured from the number of pulses and the TCD area when the adsorption was saturated. Next, the average value of the CO adsorption amounts of the three quantities of the catalysts obtained as described above was calculated as "CO adsorption amount". The obtained results are shown in Table 5.

<Measurement of Dispersion Degree of Active Metal Particle>

In addition, the dispersion degree (%) of the active metal particles was calculated from the above-obtained CO adsorption amount and the mass of the active metal particles using the following equation (3). The obtained results are shown in Table 5.

[Dispersion Degree (%) of Active Metal Particles]=([CO Adsorption Amount (ml) Adsorbed per 1 g of Catalyst]/[Mass (mass %) of Active Metal Particles Contained per 1 g of Catalyst])×100 (3)

TABLE 5

| | Support | Thickness (nm) of Silica Layer | Active Metal Pt (mass %) | Active Metal Pd (mass %) | CO Adsorption Amount (ml/g) of Catalyst | Average Particle Size (nm) of Active Metal Particles | Dispersion Degree (%) of Active Metal |
|---|---|---|---|---|---|---|---|
| Example 1 | $Al_2O_3$ | 1.5 | 1.0 | 0.5 | 0.5813 | 1.5139 | 33.75 |
| Comparative Example 1 | $Al_2O_3$ | — | 1.0 | 0.5 | 0.4107 | 2.524 | 21.05 |
| Comparative Example 2 | $SiO_2$ | — | 1.0 | 0.5 | 0.1770 | 4.770 | 10.28 |

As clearly seen from a comparison between the results of Example 1 and the results of Comparative Examples 1 and 2 shown in Table 5, it was found that, in the exhaust gas purification catalyst of Example 1, the dispersion degree of the active metal particles (Pt—Pd alloy) was high.

It was found from the above results that the exhaust gas purification catalyst according to the embodiment of the invention exhibits sufficient oxidation activity to carbon monoxide and hydrocarbon even at a low temperature.

As described above, according to the embodiment of the invention, it is possible to provide an exhaust gas purification catalyst capable of exhibiting sufficient oxidation activity to carbon monoxide and hydrocarbon at a low temperature. In this way, the exhaust gas purification catalyst according to the embodiment of the invention can exhibit sufficiently high oxidation activity to CO and HC at a low temperature. Therefore, by bringing exhaust gas exhausted from an internal combustion engine such as a diesel engine into contact with the exhaust gas purification catalyst according to the embodiment of the invention, CO and HC in the exhaust gas can be sufficiently purified. From this point of view, the exhaust gas purification method according to the embodiment of the invention can be suitably adopted, for example, as a method of purifying CO and HC in exhaust gas exhausted from an internal combustion engine such as a diesel engine. Accordingly, the exhaust gas purification catalyst, the method of producing the same, and the exhaust gas purification method using the same according to the embodiments of the invention are particularly useful, for example, as an exhaust gas purification catalyst for purifying CO and HC in exhaust gas exhausted from an internal combustion engine such as a diesel engine, a method of producing the same, and an exhaust gas purification method using the same, respectively.

What is claimed is:

1. An exhaust gas purification catalyst comprising:

an alumina support;

a silica layer that is formed on a surface of the alumina support; and active metal particles that are particles of platinum and palladium supported on the silica layer, wherein the active metal particles include fine particles and a ratio of the fine particles having a particle size of 2.0 nm or less to all the active metal particles is 50% or higher, and the fine particles include fine alloy particles and a ratio of the fine alloy particles having a palladium content ratio of 10 at % to 90 at % to all the fine particles is 50% or higher.

2. The exhaust gas purification catalyst according to claim 1, wherein the ratio of the fine particles to all the active metal particles is 90% or higher in terms of the number of particles, and the ratio of the fine alloy particles to all the fine particles is 80% or higher in terms of the number of particles.

3. The exhaust gas purification catalyst according to claim 1, wherein an average thickness of the silica layer is 0.5 times to 2.5 times a thickness of a monolayer of alumina.

4. The exhaust gas purification catalyst according to claim 1, wherein an average particle size of the active metal particles is 2.0 nm or less.

5. The exhaust gas purification catalyst according to claim 1, wherein a support amount of platinum is 0.1 parts by mass to 10 parts by mass in terms of metal with respect to 100 parts by mass of the alumina support, and a support amount of palladium is 0.01 parts by mass to 5.0 parts by mass in terms of metal with respect to 100 parts by mass of the alumina support.

6. A method of producing an exhaust gas purification catalyst comprising:

obtaining an alumina support including a silica layer by supporting silica on a surface of the alumina support using an organic silicon compound;

supporting platinum and palladium on the alumina support including the silica layer using a solution of a platinum salt and a palladium salt; and obtaining the exhaust gas purification catalyst according to claim 1 by performing a heat treatment on the alumina support on which platinum and palladium are supported.

7. An exhaust gas purification method comprising purifying exhaust gas exhausted from an internal combustion engine by bringing the exhaust gas into contact with the exhaust gas purification catalyst according to claim 1.

* * * * *